United States Patent [19]

Mounts et al.

[11] 4,185,303

[45] Jan. 22, 1980

[54] RUN LENGTH ENCODING OF FACSIMILE PICTURES

[75] Inventors: Frank W. Mounts, Colts Neck; Arun N. Netravali, Matawan; Kenneth A. Walsh, Atlantic Highlands, all of N.J.

[73] Assignee: Bell Telephone Laboratories, Incorporated, Murray Hill, N.J.

[21] Appl. No.: 965,181

[22] Filed: Nov. 30, 1978

[51] Int. Cl.² .............................................. H04N 1/00
[52] U.S. Cl. .................................... 358/261; 358/135
[58] Field of Search ............... 358/133, 135, 260, 261

[56] References Cited

U.S. PATENT DOCUMENTS

| | | | |
|---|---|---|---|
| 3,937,871 | 2/1976 | Robinson | 358/135 |
| 4,060,834 | 11/1977 | Mounts et al. | 358/261 |
| 4,086,620 | 4/1978 | Bowen et al. | 358/133 |
| 4,101,934 | 7/1978 | Fukuoka | 358/261 |

*Primary Examiner*—Robert L. Griffin
*Assistant Examiner*—Edward L. Coles
*Attorney, Agent, or Firm*—Barry H. Freedman

[57] ABSTRACT

A series of bits which represent the intensity values of elements of a facsimile picture are preprocessed to eliminate runs of length one, and then applied to a predictive encoder which treats values for alternate pels in two distinct ways. Specifically, the value of every odd pel is predicted, based upon the intensity values of some surrounding picture elements. Each prediction is compared with the true intensity value to yield an error signal. The encoder is also arranged to generate a reference signal which indicates whether the confidence in each prediction for odd pels is high or low. The error values for odd pels within a predefined reordering interval are then sorted or reordered into two groups, dependent upon the reference value. On the other hand, the intensity values of even pels are predicted only when the values cannot be precisely determined from the two previous and subsequent values; the error values for even pels are assembled into a third group. When data for an entire reordering interval has been processed, each of the groups is run length coded for transmission. By encoding even pel values only when they are needed, the amount of data required to represent the facsimile picture is reduced, at the expense of only a slight loss in detail, which is not objectionable. Further, since the statistics of the groups formed by reordering are different, different code dictionaries can be used for run length coding.

21 Claims, 10 Drawing Figures

| LINE | PEL NUMBER | 1 | 2 | 3 | 4 | 5 | 6 | 7 | 8 | 9 | 10 | 11 | 12 | 13 | 14 | 15 | 16 | 17 | 18 | --- | N |
|---|---|---|---|---|---|---|---|---|---|---|---|---|---|---|---|---|---|---|---|---|---|
| 1 | INPUT INTENSITY VALUE | 0 | 0 | 0 | 0 | 1 | 0 | 0 | 0 | 1 | 1 | 0 | 1 | 1 | 0 | 1 | 0 | 1 | 0 | | |
| 2 | PREPROCESS INTENSITY VALUE SCHEME 1 | 0 | 0 | 0 | 0 | 0 | 0 | 0 | 0 | 1 | 1 | 1 | 1 | 1 | 1 | 1 | 1 | 1 | 1 | | |
| 3 | PREPROCESS INTENSITY VALUE SCHEME 2 | 0 | 0 | 0 | 0 | 1 | 1 | 0 | 0 | 1 | 1 | 0 | 0 | 1 | 1 | 1 | 0 | 0 | 0 | | |

| LINE 1 | $E_1$ | $E_2$ | $E_3$ | $E_4$ | $E_5$ | $E_6$ | $E_7$ | $E_8$ | $E_9$ | $E_{10}$ | $E_{11}$ | $E_{12}$ | $E_{13}$ | $E_{14}$ | $E_{15}$ | $E_{16}$ | | $E_{N-1}$ | $E_N$ |
|---|---|---|---|---|---|---|---|---|---|---|---|---|---|---|---|---|---|---|---|
| LINE 2 | 1 | | 1 | | 0 | | 1 | | 0 | | 0 | | 1 | | 1 | | | | 0 |
| LINE 3 | | 1 | | 0 | | 0 | | 1 | | 0 | | 0 | | 1 | | 0 | | | 1 |
| LINE 4 | $E_1$ | $E_3$ | $E_7$ | $E_{13}$ | $E_{15}$ | ---- | $E_{N-1}$ | $E_{11}$ | $E_9$ | $E_5$ | | $E_2$ | $E_8$ | $E_{14}$ | ---- | $E_N$ | | | |
| | GROUP 1 | | | | | | GROUP 2 | | | | | GROUP 3 | | | | | | | |

FIG. 9
RECEIVER

FIG. 10

RUN LENGTH ENCODING OF FACSIMILE PICTURES

BACKGROUND OF THE INVENTION (1) Field of the Invention

The present invention pertains generally to encoding of pictorial data and, more particularly, to encoding of two level (black and white) facsimile pictures using run length coding.

(2) Description of the Prior Art

In U.S. Pat. No. 4,060,834 issued to F. W. Mounts and A. N. Netravali on Nov. 29, 1977, a system for increasing the run length of digital signals is described wherein, in the context of facsimile signals, a prediction error signal is reordered into two groups in accordance with a reference signal which indicates the degree of confidence in the predicted error values. This system provides the advantage that longer runs are formed, since prediction errors are less likely to occur in the good group. This in turn permits more efficient coding. An extension of the aforesaid Mounts et al system is described in an application Ser. No. 926,330 filed July 20, 1978 by the present applicants and assigned to the same assignee. In that system, certain runs in the reordered data are dropped, while the lengths of certain other runs are combined or bridged. Also, different run length code dictionaries are used for the runs in each group, without the need to encode any indicia of which code dictionary was used.

While the aforementioned techniques are effective in improving the efficiency with which facsimile signals may be encoded, it has been found that with a slight modification of the original picture data, by elimination of all horizontal runs of "black" or "white" picture elements which are of length one, a still further and significant decrease in entropy can be achieved. This improvement, furthermore, does not excessively degrade the picture quality, where the original picture is of high resolution (e.g., 200 dots/inch).

SUMMARY OF THE INVENTION

In accordance with the present invention, a facsimile signal is preprocessed to eliminate runs of length one. This is done by changing the value of every "single" picture element, or by changing the value of either the preceding or subsequent element, so as to "double up" the singleton.

After preprocessing, alternate intensity values in a picture line (or any other convenient reordering interval containing N pels) are treated differently. For the N/2 odd pels, a prediction of *every* intensity value is made, based upon the intensity values of some surrounding pels, and each prediction is compared with its true value to yield a prediction error value. In a manner similar to that described in the Mounts et al '834 patent, the predictor also generates a reference signal which indicates whether the confidence in each prediction is low or high. The odd pel error values are then sorted into first and second groups, in accordance with the confidence value. On the other hand, for the N/2 even pels, an intensity value prediction is only used when the value cannot be precisely determined from the intensity value of the two previous pels and the following pel. The prediction error values computed for these "needed" even samples are then assembled into a third group, which will generally contain fewer than N/2 bits.

When error data for an entire reordering interval has been assembled, data in each of the groups is run length coded, group by group. Since the bit total in the three groups will generally be less than N (because some even samples were not needed), coding efficiency is increased. Also, different run length code dictionaries can be used for the odd pel groups and the even pel group, each code dictionary being tailored to the expected run length statistics of the group, again reducing entropy as explained in the aforecited Mounts et al application.

BRIEF DESCRIPTION OF THE DRAWINGS

The foregoing and additional features and advantages will be more readily understood by consideration of the following detailed description, when read in light of the accompanying drawing in which.

DETAILED DESCRIPTION

Figure 1:
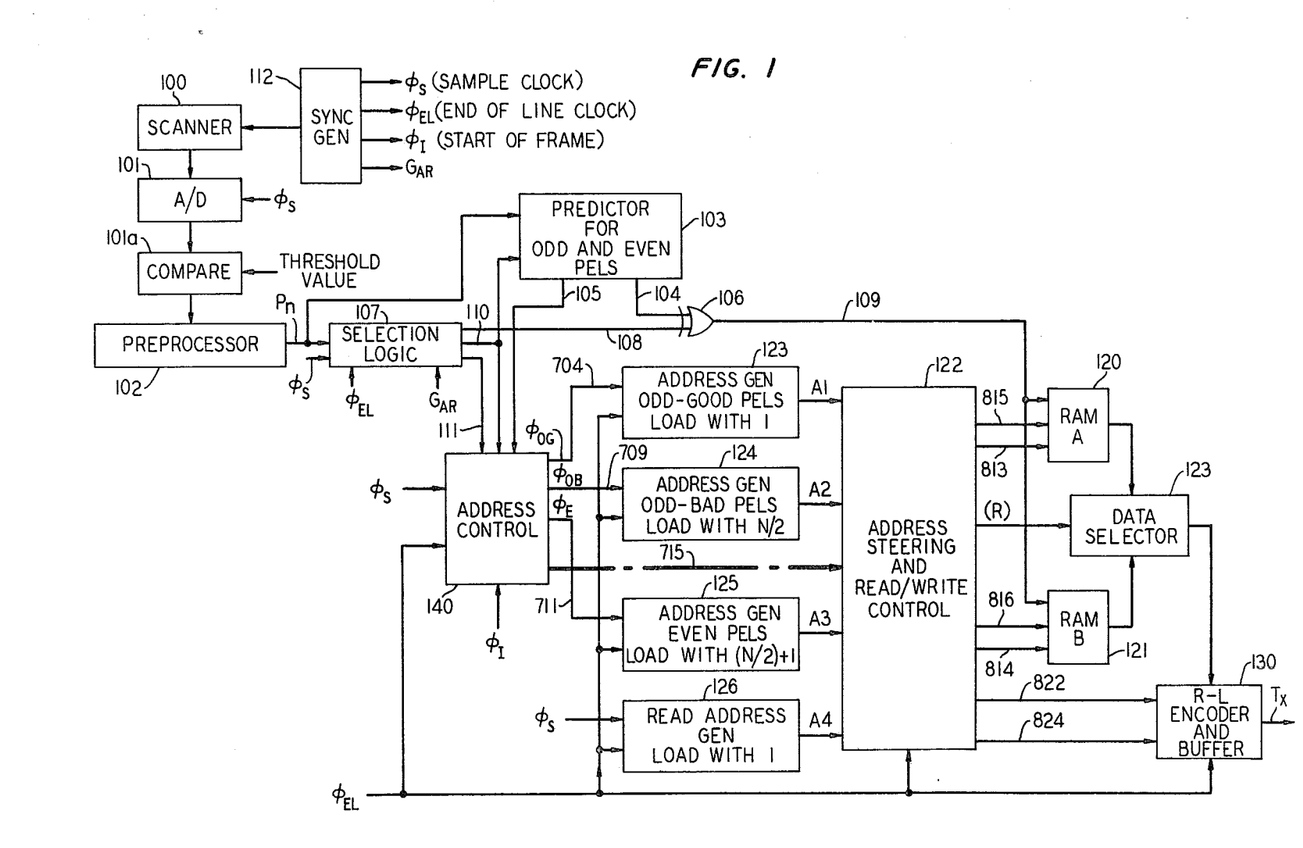
FIG. 1 is an overall block diagram of a facsimile signal encoder constructed in accordance with the principles of the present invention.

An overall block diagram of a facsimile picture encoder in accordance with the present invention is shown in FIG. 1. The encoder includes a scanner 100 arranged to scan a picture along a plurality of parallel scan lines to produce an output facsimile signal representing the picture intensity. In a conventional manner, this output signal is sampled in A/D converter 101 and compared to a threshold value in comparator 101a to produce a binary signal, with the value of each bit corresponding to the intensity of a particular picture element (pel) in the picture. By appropriately adjusting the scan rate and the sample rate $\phi_s$ generated by a sync generator 112, the binary signal can reproduce the picture with good resolution. Data rates corresponding to sampling on the order of 200 pels/inch are typical.

In accordance with the present invention, the binary intensity signal output from comparator 101a is applied to a preprocessor 102 which serves to eliminate runs of length one. This elimination of single intensity values can be accomplished by inverting the single value itself (i.e., a "0" bit becomes a "1" bit and vice versa) or by inverting the intensity value of the picture element before or after the single value so as to "double up" the single value. While the former technique has been found to be more efficient than the latter, either type of preprocessing does not seriously degrade the quality of the reconstructed facsimile picture.

Figure 2:
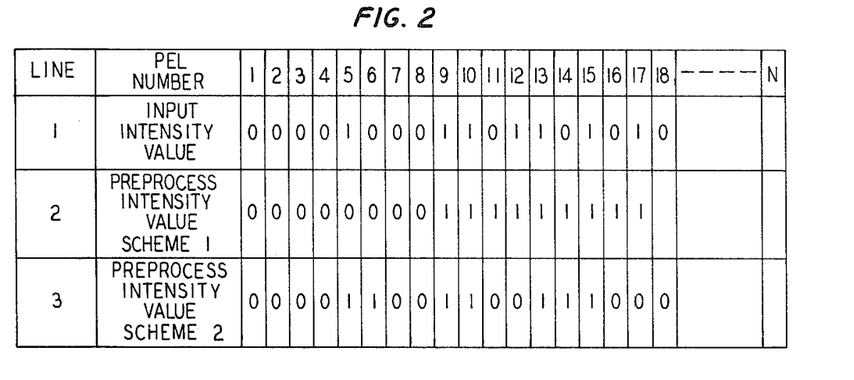
FIG. 2 shows the intensity values from a portion of one recording interval of facsimile data and three different sets of corresponding intensity values after preprocessing in accordance with the invention.

Examples of the results of preprocessing using different schemes are illustrated in FIG. 2. Line 1 shows a portion of a line of input intensity values which forms a part of a reordering interval of N picture elements; the pels are numbered from 1 to N, but only 18 elements are shown in this example. In scheme 1, on line 2, the intensity values are processed so that the "single" values (runs of length one) are inverted. Specifically, pel 5 becomes a "0", pel 11 becomes a "1", and the values of pels 14, 16 and 18 are also inverted. This scheme can be implemented simply by monitoring the input intensity data, three elements at a time. If the patterns 010 or 101 are detected, the data is changed to 000 and 111, respectively, and monitoring proceeds using the inverted value.

In scheme 2, on line 3, the input values are processed such that the value of the pel *following* a "single" value (run of length one) is inverted. Specifically, pel 6 changes from a "0" to a "1", pel 12 is inverted from a "1" to a "0", and pels 14 and 17 are also inverted. This scheme can also be implemented by monitoring the intensity data for three pels at a time, so that the pattern 010 becomes 011 and the pattern 101 becomes 100.

After preprocessing, the intensity values are applied to a predictor 103 which includes delay elements arranged to store the values corresponding to picture elements in the neighborhood of the pel for which a prediction is being made. Based upon the neighborhood values, predictor 103 generates a predicted value on line 104. A simple look-up operation may be used, wherein each possible combination of neighborhood values is stored in a ROM and each combination is assigned a preselected prediction value. In addition, predictor 103 is arranged to generate a good/bad reference or state signal on line 105 which indicates the degree of confidence in each prediction. This reference or state signal may be generated in a manner similar to that used in reference signal generator 20 of the Mounts et al patent. Each possible combination of neighborhood values is looked up to yield a binary reference value, with a 1 representing a "good" state wherein the prediction confidence is high and a 0 representing a "bad" state wherein the prediction confidence is low.

In accordance with the present invention, the preprocessed intensity values are compared with the predicted values thereof (from line 104) in an exclusive OR gate 106, in order to generate prediction error values, but only selected ones of these error values are eventually run length coded. The selected error values consist of first and second sets of values, the former comprising error values associated with every alternate intensity value output from preprocessor 102 and the latter comprising error values associated with only particular remaining ones of the intensity values. In a specific embodiment to be described hereinafter, the first set consists of values for all odd numbered pels output from preprocessor 102, while the second set includes only those values for even numbered pels which cannot be determined from the values of the prior and subsequent pels. Values in the second set are called "needed" values, which can be determined as illustrated by several examples where X is an even pel:

| Example | Values | X |
|---------|--------|---|
| 1 | 0 X 0 | 0 |
| 2 | 1 X 1 | 1 |
| 3 | 0 1 X 0 | 1 |
| 4 | 1 0 X 1 | 0 |
| 5 | 1 1 X 0 | ? |
| 6 | 0 0 X 1 | ? |

In the first and second examples, the values surrounding X are the same. Since single values cannot exist after preprocessing, the value of X must be the same as that of both neighbors. Accordingly, the value of X is not "needed" in examples 1 and 2. In examples 3 and 4, the values immediately surrounding X are different. However, knowledge of the two values preceding X and of the value following X again predetermine what value X must have, since preprocessing necessitates that all runs must have a length of at least two. Thus, in examples 3 and 4, the value of X is also not "needed". In examples 5, 6, the value of X cannot be determined from that of its neighbors. Accordingly, in these cases the value of X is "needed".

When an even value is needed, a selection logic circuit 107 is arranged to provide a signal, labeled $E_v$ on line 111, to an address control generator 140. As will be explained hereinafter, generator 140 allows entry of the needed value into a random access memory for subsequent run length coding. On the other hand, non-needed even values are discarded.

Selection logic 107 also provides two other functions. First, it generates an output labeled DATA on line 108, which as explained later, is a delayed version of the input. The DATA signal is applied to the remaining input of exclusive OR gate 106, so that the output of gate 106 (on line 109) represents the prediction error values of the preprocessed facsimile signal.

Second, selection logic 107 supplies an odd pel signal on line 110 to predictor 103, so that different predictor patterns may be used for odd and even samples.

Figure 3:
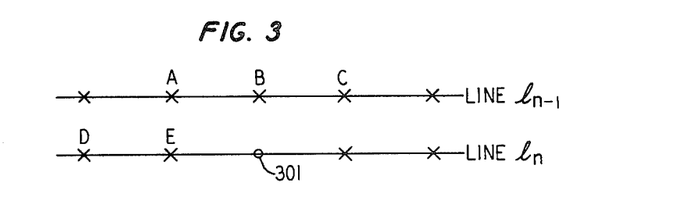
FIG. 3 shows the pels used to form predicted intensity values.

The different prediction patterns used for odd and even pel values can be better understood by referring to FIG. 3, which illustrates the locations of picture elements A, B and C on the previous scan line $1_{n-1}$, and picture elements D and E on the present scan line $1_n$. For an odd picture element 301 on line $1_n$, the intensity value prediction is based on the values of the four pels ABCD, which are the pels directly above, above and to the left, above and to the right of the pel 301, and the pel on line $1_n$ which is two elements prior to element 301. The intervening element E is not used to predict the value of element 301, since the receiver cannot determine how to reconstruct the value of element E until after element 301 is decoded. The actual association of a predicted value with each fourtuple ABCD may be accomplished in accordance with FIG. 3 of the Mounts et al patent.

By way of comparison, a much simpler prediction pattern may be used for even pels. This pattern can include the values of only pels B and E immediately above and just prior to even pel 301 or, in a yet simpler arrangement, the value of even pel 301 can be made the same as the value of pel B.

Figure 4:
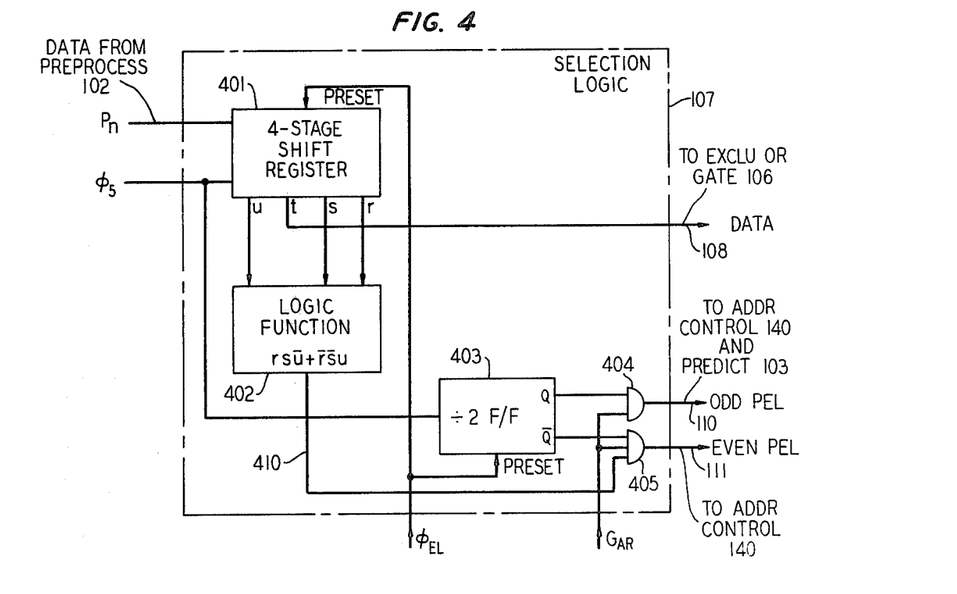
FIG. 4 is a circuit diagram of selection logic 107 of FIG. 1.

The details of selector logic 107 are shown in FIG. 4. This circuit receives an input from preprocessor 102 and $\phi_s$ timing signals from a sync generator 112. At the beginning of each reordering interval, a shift register 401 having stages labeled r, s, t and u is preset by a $\phi_{EL}$ pulse which occurs after N $\phi_s$ pulses have been counted, as explained below. Data from preprocessor 102 is entered in register 401 under the control of $\phi_s$ clock signals from sync generator 112, and the values stored in the register stages r, s and u are coupled to a logic function circuit 402. The value stored in stage t is the DATA output which is coupled to exclusive OR gate 106 on line 108.

Logic function circuit 402 is arranged to generate a high output on line 410 when an even pel value is "needed", i.e., when the value cannot be determined from that of its neighbors. As will be seen from Table 1 below, an even pel value is needed only when (r s $\bar{u}$) or ($\bar{r}$ $\bar{s}$ u) are high, and u represents an odd pel:

TABLE 1

| Possible combination | r (even) | s (odd) | t (even) | u (odd) | Eliminated by preprocessing | Value of t determined by values of r, s and u | Value of t is "needed" |
|---|---|---|---|---|---|---|---|
| 1 | 1 | 1 | 1 | 1 | | | |
| 2 | 1 | 1 | 1 | 0 | | | |
| 3 | 1 | 1 | 0 | 1 | | | |
| 4 | 1 | 1 | 0 | 0 | | | |
| 5 | 1 | 0 | 1 | 1 | | | |
| 6 | 1 | 0 | 1 | 0 | | | |
| 7 | 1 | 0 | 0 | 1 | | | |
| 8 | 1 | 0 | 0 | 0 | | | |
| 9 | 0 | 1 | 1 | 1 | | | |
| 10 | 0 | 1 | 1 | 0 | | | |
| 11 | 0 | 1 | 0 | 1 | | | |
| 12 | 0 | 1 | 0 | 0 | | | |
| 13 | 0 | 0 | 1 | 1 | | | |
| 14 | 0 | 0 | 1 | 0 | | | |
| 15 | 0 | 0 | 0 | 1 | | | |
| 16 | 0 | 0 | 0 | 0 | | | |

The preceding Table, which applies to scheme 1 described previously, lists all 16 possible combinations (before preprocessing) of intensity values for pels r, s, t and u. Assuming that pels r and t are even, and pels s and u are odd, it is desired to determine if the value of even pel t can be derived from knowledge of the values of pels r, s and u. Noting that preprocessing eliminates the combinations shown on lines 3, 5, 6, 11, 12 and 14, it will be seen that the value of t is uniquely determined in six remaining cases, leaving only the combinations of lines 2, 4, 13 and 15. These combinations are logically represented by r s $\bar{u}$+$\bar{r}$ $\bar{s}$ u, which is the function performed in circuit 402.

As shown in FIG. 4, logic 107 also includes a toggle circuit 403 which receives $\phi_s$ clock pulses at its data input. The Q output of circuit 403, which is high for odd numbered pels, is coupled to one input of an AND gate 404, the other input of which is connected to a $G_{AR}$ output from sync generator 112. This output goes high during the active region of each reordering interval; this region begins when the data stored in stage t of register 401 represents the first pel in the reordering interval. The output of AND gate 404 is called the odd pel signal, and is extended to predictor 103 via line 110. When line 110 is high, predictor 103 uses an odd predictor pattern; when low, the even predictor pattern is used.

The $\bar{Q}$ output of toggle circuit 403 is applied to one input of AND gate 405, which also receives the $G_{AR}$ input from sync generator 112 and the output from logic function generator 402 on line 410. When the output of gate 405 is high, an even pel value is "needed"; this signal, designated $E_V$, is extended to address control circuit 140 on line 111.

Toggle circuit 403 is set at the beginning of each reordering interval by an $\phi_{EL}$ pulse generated by sync generator 112. Shift register 401 is initialized by setting u=$\bar{p}_1$, t=$p_1$, s=$\bar{p}_1$ and r=$p_1$, where $p_1$ is the intensity value of the first pel in the reordering interval.

Returning to FIG. 1, the unordered prediction error value output from exclusive OR gate 106 is entered into one or the other of random access memories 120 or 121, depending upon control signals developed by address steering and read/write control circuit 122. Two RAM's are used in alternation, so that data from one reordering interval is written into one RAM while data stored in the other RAM is read out and applied to run length encoder 130 via data selector 123. Reordering is accomplished by controlling the addresses at which data is written into RAM's 120 and 121; non-needed even pel values are discarded by inhibiting the entry of this data into the RAM's. Addresses for RAM's 120 and 121 are generated by four address generators 123, 124, 125 and 126, as follows: generator 123 provides write addresses for odd pels for which the state signal is a "1", indicating high confidence; generator 124 provides write addresses for odd pels for which the state signal is a "0", indicating low confidence; generator 125 provides write addresses for even pels, but only for those that are needed (i.e., when even data is valid); and generator 126 provides read addresses when reordered error values stored in either RAM 120 or 121 are being read out to encoder 130.

Figure 5:
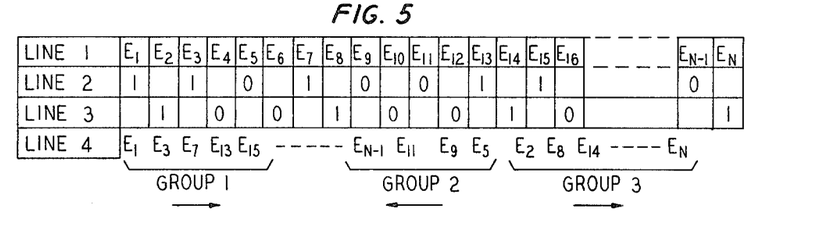
FIG. 5 is an example showing reordering of N error values into three groups in accordance with the present invention.

The reordering process performed by the apparatus of FIG. 1 is illustrated in an example in FIG. 5, which shows on line 1 a series of N error values (numbered 1 to N) output from exclusive OR gate 106 before reordering. Each error value could be a "1" or a "0", indicating the presence or absence of a prediction error, respectively.

On line 2, an example of possible reference or state values are shown for each odd numbered error value. These state values are generated by predictor 103 and may follow a scheme similar to that described in the Mounts et al patent. As explained previously, a "1" represents a good (high confidence) prediction and a "0" represents a bad (low confidence) prediction.

On line 3, an example of a possible even data valid signal ($E_V$) on line 111 is shown for the even numbered pels. As stated previously, a "1" indicates a "needed" value, and a "0" indicates that the error value can be reconstructed at the receiver from the surrounding values, so that encoding is not necessary.

The error values on line 1 are reordered into three groups on line 4, as follows: the first group includes error values from odd numbered pels with good states, and these error values are stored in RAM addresses numbered in increasing order, beginning 1, 2, 3 . . . The second group includes error values from odd numbered pels with bad states, and these error values are stored in RAM addresses numbered in decreasing order, beginning with N/2, (N/2)−1, (N/2)−2, and so on. Together, the first and second groups contain exactly N/2 error values, since of the N error values in a reordering interval, N/2 are odd.

The third group of reordering includes needed even error values, and these are stored in RAM addresses numbered in increasing order, beginning at (N/2)+1 and continuing (N/2)+2, (N/2)+3, and so on. This group can contain N/2 error values at most, but since not every even value will be needed, fewer values will usually be included in this group.

Line 4 in FIG. 5 shows the results of reordering in accordance with the invention. Error value $E_1$ is good/odd, and takes the first address in group 1. Error value $E_2$ is even and needed, and takes the first address in group 3, which is address (N/2)+1. Error value $E_3$ is good/odd and thus takes the next available address in group 1, which is address 2. Error value $E_4$ is even but is not needed; this value is not written into the RAM and does not appear on line 4. Error value $E_5$ is bad/odd, and takes the first address in group 2, which is N/2. Error value $E_6$ is dropped, and error value $E_7$ takes address 3 in group 1.

The reordering process continues until the end of the reordering interval. In this example, five even values $E_4$, $E_6$, $E_{10}$, $E_{12}$ and $E_{16}$ are not needed; the good/odd group (group 1) contains five error values, and the bad/odd group contains four error values. The data on line 4 is then ready for run length coding, on a group-by-group basis.

Figure 6:
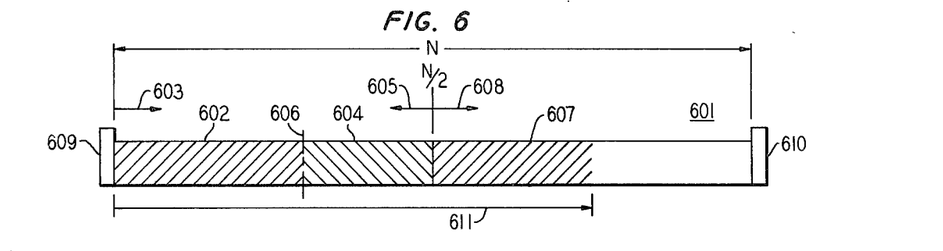
FIG. 6 is a diagram further illustrating the formation of the groups is the reordered data prior to run length coding.

The organization of the reordered error data is further illustrated in FIG. 6. Block 601 represents the storage capacity of RAM's 120 or 121, which is N bits. During reordering, good/odd values are entered into a first group 602, in the order or sequence shown by arrow 603, while bad/odd values are entered into a second group 604 in the opposite sequence, shown by arrow 605. Together, the first and second groups fill exactly N-2 bits. Since more good than bad values are normally expected, the boundary line 606 between the first and second groups will usually be located toward the N/2 midpoint in FIG. 6. The needed even values are entered in a third group 607, in the sequence shown by arrow 608. This group is usually smaller than N/2, since some even error values will not be needed.

After reordering as in FIG. 6, the error values are sequentially run length coded, starting with group 1, then group 2 and finally group 3. Readout occurs in the sequence indicated by arrow 611. A sync word 610 is inserted at the end of the data in the reordering interval; sync word 609 separates the present data from that of the prior interval. As observed in FIG. 6, the actual amount of data that is to be run length coded will usually be less than N bits.

During the run length coding of the data in FIG. 6, a first run length code is used for the odd pel data in groups 1 and 2, and a second code is used for the valid even data in group 3. These codes are based upon the expected statistics in each group, and can be Huffman type codes explained in the aforenoted Mounts et al application. At the receiver, the received run length codes are decoded using the first code set until N/2 error values have been recovered. Thereafter, the remaining run length codes are decoded using the second code set to obtain the remaining error values in the reordering interval. The same procedure is then followed for succeeding intervals.

Figure 7:
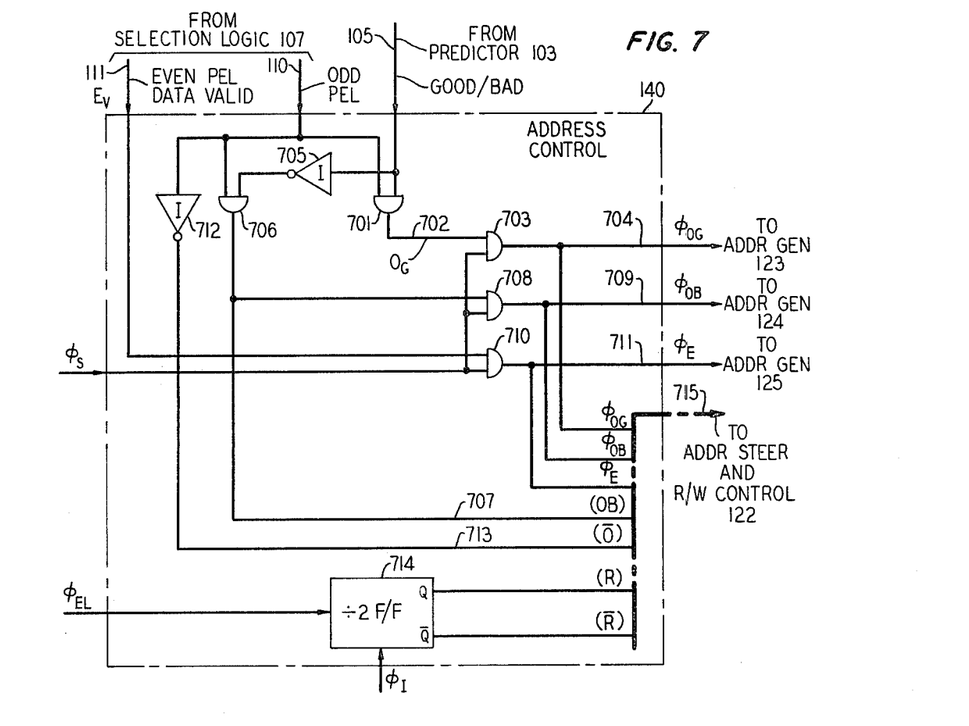
FIG. 7 is a block diagram of address control circuit 140 of FIG. 1.

The reordering described in FIG. 6 is accomplished by supplying address generators 123-126 with appropriate clock and control signals generated by an address control circuit 140 which is shown in detail in FIG. 7. This circuit receives the odd pel signal from line 110, a G/B (good/bad) state signal from predictor 103 on line 105, and the even data valid ($E_V$) signal from line 111. The odd pel and G/B signals are applied to an AND gate 701 to produce an output on line 702 labeled $O_G$, which is high for good/odd error values; the $O_G$ signal also enables an AND gate 703 to pass $\phi_s$ pulses, thereby producing a $\phi_{OG}$ timing pulse on line 704.

The G/B state signal is inverted in inverter 705 and applied with the odd pel signal to an AND gate 706. The output of this gate on line 707 is labeled $O_B$, which is high for bad/odd error value. The $O_B$ signal also enables an AND gate 708 to pass $\phi_s$ pulses, thereby producing a $\phi_{OB}$ timing pulse on line 709.

The $E_V$ signal is used to enable another AND gate 710, so that for valid even error values a timing pulse $\phi_E$ is produced on line 711 at the occurrence of a $\phi_s$ sample pulse. Also, the odd pel signal on line 110 is inverted in inverter 712 to provide a $\overline{O}$ (not odd) signal on line 713. The address control circuit of FIG. 7 also includes a divide-by-two flip-flop 714, which is initialized at the beginning of each facsimile transmission by a $\phi_I$ pulse from sync generator 112. The flip-flop receives $\phi_{EL}$ pulses at the end of each reordering interval, and provides R and $\overline{R}$ outputs on lines 715 and 716, respectively. These outputs are alternately high during successive reordering intervals, and are used to control the read/write mode of RAM's 120 and 121.

Returning to FIG. 1, address generators 123-126 are each initialized by a $\phi_{EL}$ pulse: generators 123 and 126 are initialized to a count of 1, generator 124 is initialized to a count of N/2, and generator 125 is initialized to a count of (N/2)+1. Each of these address generators may be a simple counter, with generators 123, 125 and 126 arranged to count up, and generator 124 arranged to count down. Generator 123 provides addresses for good/odd error values, and counts in response to $\phi_{OG}$ pulses on line 704. Generator 124 provides addresses for bad/odd error values, and counts in response to $\phi_{OB}$ pulses on line 709. Generator 125 provides addresses for valid even error values and counts in response to $\phi_E$ pulses on line 711. Generator 126 provides read addresses and counts in response to $\phi_s$ pulses from signal generator 112.

Figure 8:
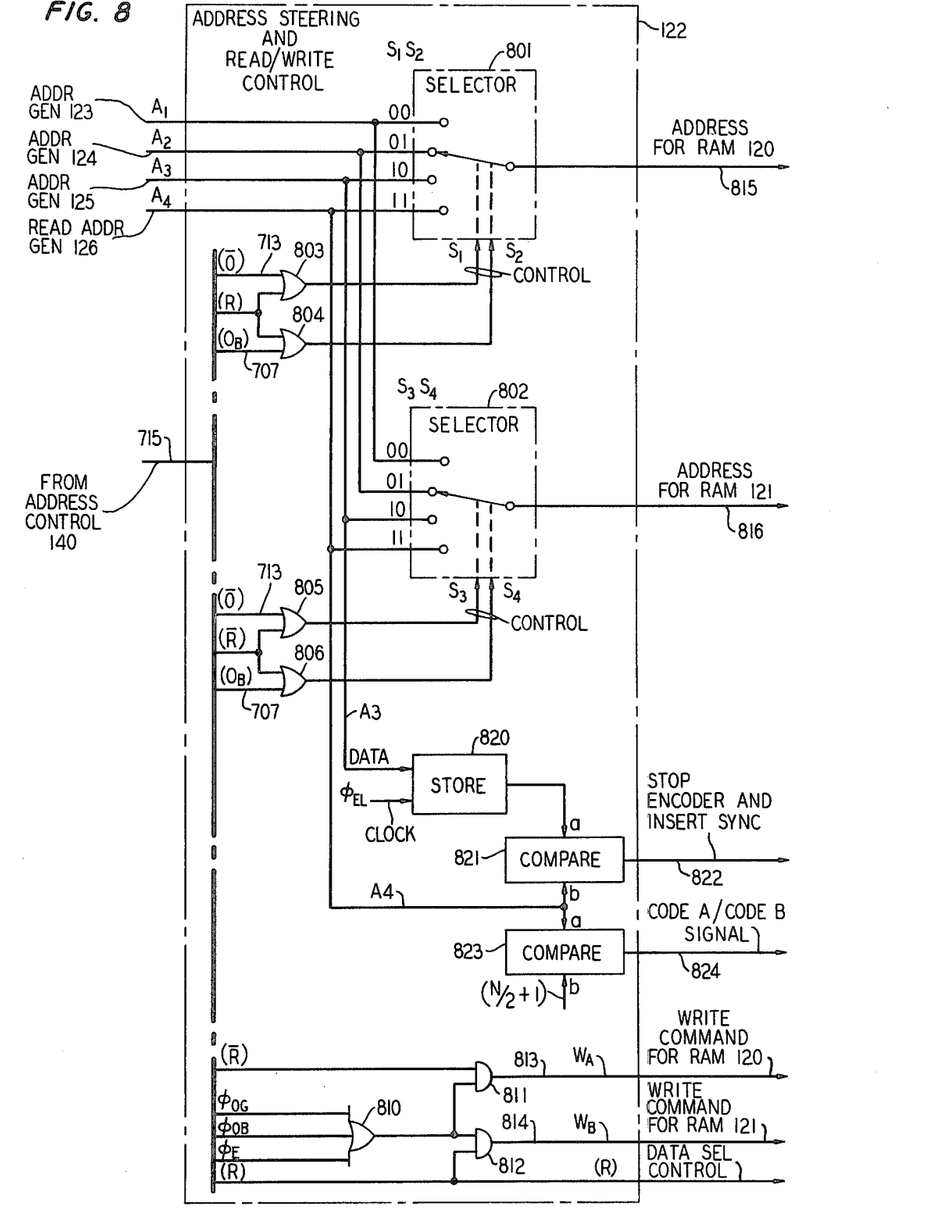
FIG. 8 is a block diagram of address steering and read/write control circuit 122 of FIG. 1.

The addresses output from generators 123-126 are appropriately routed to RAM's 120 and 121 via address starting and read/write control circuit 122, which is shown in detail in FIG. 8. This circuit receives various control signals from address control circuit 140 on line 715 and includes two data selectors 801 and 802, each of which receives inputs from all of the address generators; for convenience, the addresses output from generators 123-126 will be labeled $A_1$-$A_4$, respectively; it being understood that each address may be represented as a multibit binary number.

Data selectors 801 and 802 each receive two control inputs ($S_1$, $S_2$ and $S_3$, $S_4$, respectively) which together control which address is routed through the selectors to RAM's 120 and 121, respectively. These control inputs are generated by OR gates 803–806 and depend upon the values of $O_B$ (from line 707), R or $\overline{R}$ (from flip-flop 714) and $\overline{O}$ (from line 713). With respect to selector 801, address $A_1$ is chosen for good/odd samples, when $\overline{O}$, R and $O_B$ are all low. Address $A_2$ is chosen for bad/odd samples, when $\overline{O}$ and R are low, but $O_B$ is high. Address $A_3$ is chosen for valid even samples when $\overline{O}$ is high but R and $O_B$ are low. Finally, address $A_4$ is chosen when R is high, during readout of RAM 120.

Similarly, selector 802 is arranged to connect the appropriate address to RAM 121, depending upon the control signals $\overline{O}$, $O_B$ and $\overline{R}$. Specifically, $A_1$ is chosen when $\overline{O}$, $\overline{R}$ and $O_B$ are all low; $A_2$ is chosen when $O_B$ is high but $\overline{R}$ and $\overline{O}$ are low; $A_3$ is chosen when $\overline{O}$ is high but $\overline{R}$ and $O_B$ are low, and $A_4$ is chosen when $\overline{R}$ is high.

In addition to data selectors 801 and 802, control circuit 122 shown in FIG. 8 also includes an OR gate 810 which provides output pulses to AND gates 811 and 812 whenever any of clock pulses $\phi_{OG}$, $\phi_{OB}$ or $\phi_E$ is produced. Gate 811 is enabled by the R output from flip-flop 714, and provides write pulses to RAM 120 on line 813. Gate 812 is enabled by the R output from flip-flop 714, and provides write pulses to the other RAM 121 on line 814. Thus, for all odd pel values and for needed even values, the output of exclusive OR gate 106 is written into one of the RAM's 120 or 121. On the other hand, for even values which are not needed, $\phi_E$ is not generated, and the value is thus not written into either memory. The R input to control circuit 122 is also passed to data selector 123, which couples the output of the correct RAM (during readout) to run length encoder 130.

During the readout cycle of RAM's 120 and 121, the memory locations which are not filled with even data must be skipped. This is accomplished by storing the highest address reached by address generator 125 (address $A_3$) in a memory 820 at the end of each reordering interval. This address is then compared with the address in address generator 126 (address $A_4$) in a comparator 821. When equality is reached, all of the valid even data has been read out, and a control pulse is developed on line 822 indicating that the sync code 610 may be appended to the run length codes generated in encoder 130. In addition, the address in generator 126 is compared with the preset value $(N/2)+1$ in a second comparator 823; when equality is reached, the odd data has been read out. At this time, the comparator output on line 824 changes state, indicating to encoder 130 that a different code dictionary is to be used for the succeeding even data.

Figure 9:
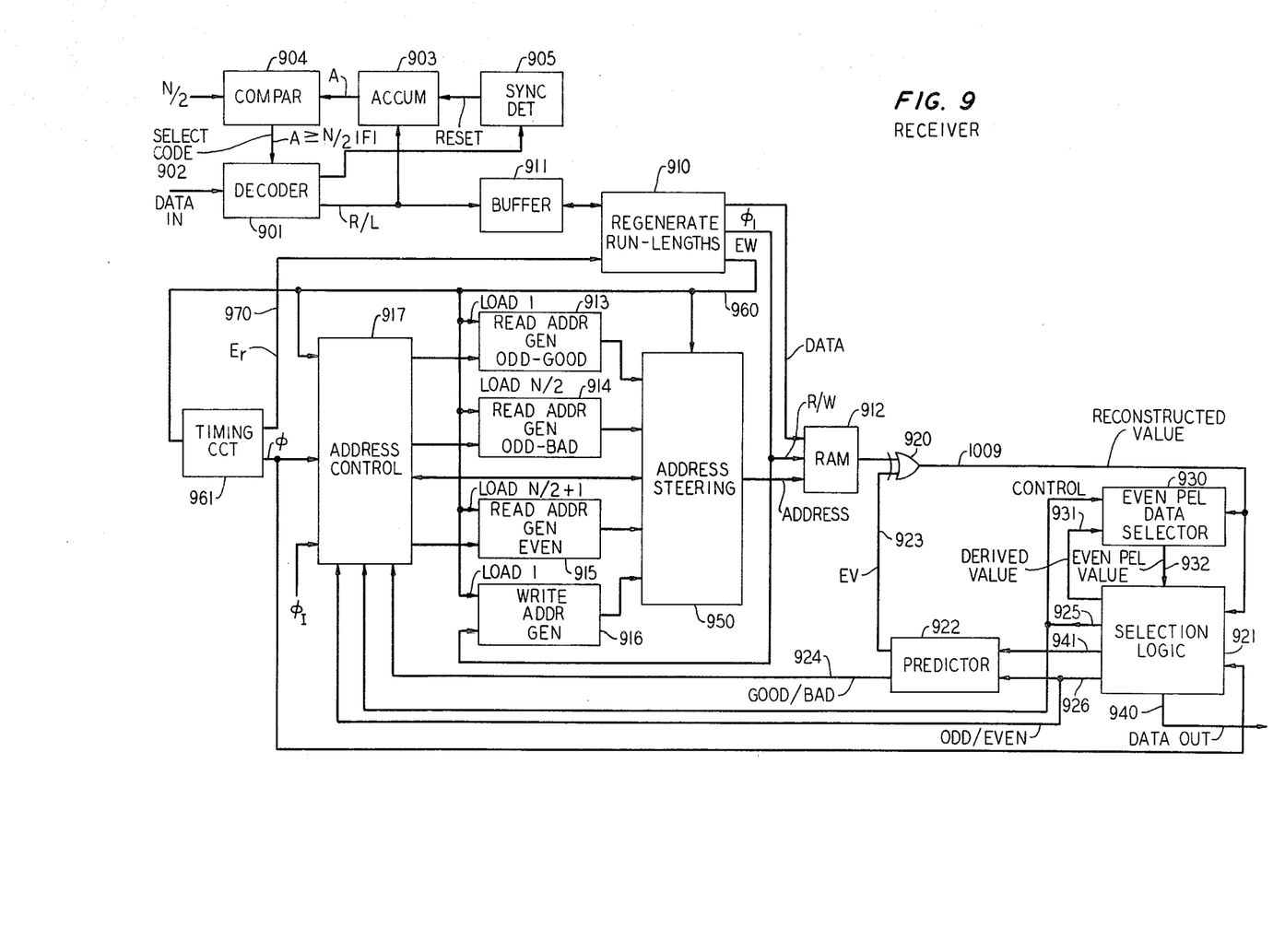
FIG. 9 is a block diagram of a receiver arranged to decode the signal output from the encoder of FIG. 1.

A block diagram of a receiver arranged to decode the signal output from encoder 130 of FIG. 1 is shown in FIG. 9. The receiver includes a run length decoder 901 which is arranged to use one of two possible code sets to decode the received data, depending upon a code select signal on line 902. The run lengths output from decoder 901 are accumulated in an accumulator 903 to determine when the code set should be changed. To this end, the output of accumulator 903 is compared with the value $N/2$ in comparator 904. When the accumulated value is equal to or greater than $N/2$, decoder 901 is switched from a first code set to a second code set, which is then used for subsequent run length codes in the reordering interval. Accumulator 903 is reset when the sync pulse separating each reordering interval is detected by a sync detector 905.

The run lengths output from decoder 901 are applied to a run length data regenerator 910 via buffer 911. The purpose of regenerator 910 is to transform the run lengths to the original series of bits from which the run lengths were generated. As each bit is output from regenerator 910, a clock signal $\phi_1$ is generated. This signal places a random access memory 912 in its write mode, so that data corresponding to the reordered error data stored in RAM 120 or 121 of FIG. 1 can be recovered. During this write cycle, sequential storage addresses are provided by a write address generator 916, which is stepped by the $\phi_1$ clock signal.

When regenerator 910 detects the sync pulse which separates each reordering interval, an $E_w$ signal is generated on line 960 to indicate the end of the write cycle. Further data is not thereafter extracted from buffer 911 until it is needed.

The $E_w$ signal is applied to a timing generator 961 to begin the read cycle, whereby the reordered error data in RAM 912 is used to reconstruct the original picture intensity values. For this purpose, generator 961 provides clock signals $\phi$ to an address control circuit 917, which performs functions similar to those of address control circuit 140 of FIG. 1. Specifically, address control circuit 917 controls a series of address generators 913–915, which are similar in function to address generators 123–125 of FIG. 1. When a good/odd value is needed, the count in address generator 913 is used and that count is then advanced by 1. When an odd/bad value is needed, the count in generator 914 is used and that count is then reduced by 1. When an even pel value is needed, the count in address generator 915 is used and that count is then increased by 1. As with generators 123–125 of FIG. 1, address generator 913 is initialized at a value of 1 at the beginning of each reordering interval, while generators 914 and 915 are initialized at the values $N/2$ and $(N/2)+1$, respectively. Addresses from generators 913–916 are routed to RAM 912 by an address steering circuit 950 which is similar to circuit 122 of FIG. 1.

The clock pulses $\phi$ are counted, during the read phase of operation, to determine when a complete interval of picture intensity data has been reconstructed. At this time, an $E_r$ signal is generated on line 970 to indicate that the read phase has ended, and this signal is used to start regenerator 910 for the next reordering interval.

Error values extracted from RAM 912 (in the order that they are needed) are each compared with a corresponding prediction thereof in an exclusive OR gate 920 to reconstruct the true intensity value for that pel. This reconstructed value is applied to one input of an even pel data selector 930 and to selection logic 921 which is described hereinafter. The data output from logic 921 on line 940 is the fully decoded picture intensity signal, which is also applied to predictor 922 on line 941. Predictor 922, which is similar in construction to predictor 103 of FIG. 1, generates the next predicted intensity value on line 923 as well as a reference or good/bad signal on line 924. The predicted value is applied to exclusive OR gate 920, while the good/bad signal is input to address control 917.

Another function of selection logic 921 is to monitor the data output from exclusive OR gate 920 to determine if the intensity value of each even pel can be derived from the intensity values of the preceding and subsequent odd pels and the preceding even pel, in a manner similar to that used in selection logic 107 of FIG. 1. If derivation is not possible, and an even pel sample value is needed, an $E_V$ signal is generated on line 925 and is used to control data selector 930. With $E_V$ high, the needed even value is obtained from the output of exclusive OR gate 920, and routed to selection logic 921 on line 932 via data selector 930. For $E_V$ low, the value derived in logic 921 is routed to selector 930 on line 931 and thence back to logic 921 on line 932. $E_V$ is also supplied to address control 917. In addition to the $E_V$ signal on line 925, logic 921 provides an odd/even signal on line 926 to predictor 922 and to address control 917. Predictor 922 can thus use the correct predictor pattern for odd and even pels.

Figure 10:
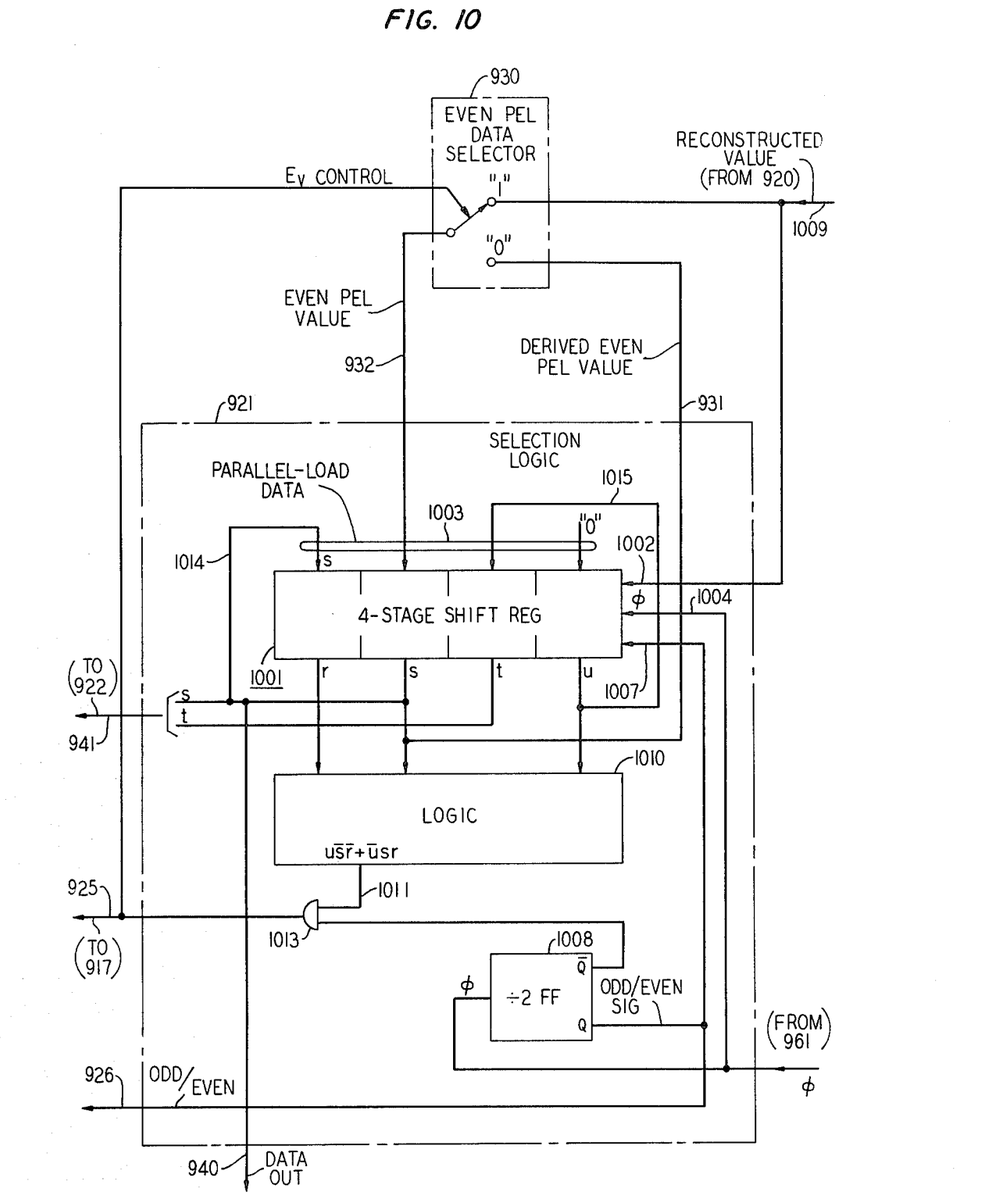
FIG. 10 is a block diagram of the selection logic and data selector of FIG. 9.

A block diagram of selection logic 921 and data selector 930 of FIG. 9 is shown in FIG. 10. At the heart of the selection logic is a four-stage shift register 1001 which can receive serial data entry on input 1002 or parallel data entry on four inputs designated generally at 1003, depending upon the state of a shift/load signal applied to input 1007. The four stages of register 1001 are labeled r, s, t and u, corresponding to the terminology used in register 401 of FIG. 4. In the shift mode, data input is into stage u, and data is shifted from right to left when a $\phi$ clock is applied on input 1004.

The logic of FIG. 10 includes a toggle flip-flop 1008 having a Q output which is high for odd pels. This output provides the odd/even signal on line 926 and the shift/load signal applied to input 1007. The shift mode is used when the Q output is high, and the parallel entry mode is used when the Q output is low.

In accordance with the invention, different decoding procedures are used for odd and even pels, since odd pels are always encoded in the apparatus of FIG. 1, but even pels are only encoded when they are needed, i.e., when their value is not derivable. For odd pel decoding, with input 1007 high, the decoded value derived from the output of exclusive OR gate 920 on line 1009 is shifted into the u stage of shift register 1001. After this shift, the preceding odd pel value will be in stage s, and stage r will contain an even pel value previously decoded. However, at this time, the even pel value for stage t is unknown, and it must be determined if this value can be derived from the preceding and subsequent values r, s and u. Inspection of the following table will be instructive in making this determination:

TABLE 2

| r | s | t | u | Derived value of t | Use Derived Value | Use Decoded Value |
|---|---|---|---|---|---|---|
| 1 | 1 | 1 | 1 | | | |
| 0 | 1 | 1 | 1 | | | |
| 1 | 0 | 1 | 0 | | | |
| 0 | 0 | 1 | | don't care | | |
| 1 | 1 | 0 | | don't care | | |
| 0 | 1 | 0 | 1 | | | |
| 1 | 0 | 0 | 0 | | | |
| 0 | 0 | 0 | 0 | | | |

In the preceding Table, all possible combinations of r, s and u are listed. In all but two cases, the value of t is derivable from the preceding value as indicated in the Table; this derived value is given logically as "s". For the remaining cases, logically given by $\overline{u}$ r s + u $\overline{s}$ $\overline{r}$, the even value is needed, and the encoded value received from the apparatus of FIG. 1 must be decoded.

The logical determination of when the value of an even pel is derivable is made in logic 1010. For the condition $\overline{u}$ s r + u $\overline{s}$ $\overline{r}$ (when the even value needs to be decoded rather than derived), logic 1010 provides a high output on line 1011. This enables an AND gate 1013 to produce an $E_V$ (even value needed) signal on line 925, but only when the $\overline{Q}$ output of flip-flop 1008 is high, indicating that an even pel value is being processed.

The $E_V$ signal on line 925 is used to control the position of data selector switch 930. With $E_V$ high, the reconstructed value on line 1009 is passed through data selector 930 to register 1001 via line 932. When $E_V$ is low, the derived value is obtained on line 931 from stage s of shift register 1001 and is passed through data selector 930 to register 1001 via line 932. $E_V$ is also coupled to address control 917, indicating that an even value is needed from RAM 902.

Whether the even value t is derived or decoded, it is inserted in register 1001 in stage s, and not in stage t, since the entry mode for even pel values is via the parallel inputs 1003. During this parallel entry, the previous value in stage s is entered in stage r, the even pel value from selector 930 is entered in stage s, and the previous value in stage u is entered in stage t, due to connections 1014, 932 and 1015, respectively. The value entered into stage u is immaterial, since it is eventually over-ridden with the even pel value. This arrangement, once completed, results in the insertion of the even value (either derived from the previous value or as decoded from the data stored in RAM 912) in its appropriate position between the preceding and subsequent odd pel values.

The values stored in the s and t stages of register 1001 are coupled to predictor 922 on line 941 to enable it to continue to make predictions of each succeeding pel intensity value and the process described above is then repeated. At the end of each reordering interval, the register is appropriately reset. The output from stage s on line 940 is the reconstructed data output from the receiver.

Various modifications and adaptations of the present invention will be readily apparent to those skilled in the art. Accordingly, it is intended that the invention be limited only by the following claims.

We claim:

1. Apparatus for encoding a series of bits each representing the intensity of an element of a picture, comprising:
    means (103) for predicting the intensity value of each pel based on previous intensity values and for generating a reference signal indicative of whether the confidence in each of said predictions is high or low;
    means (106) for comparing the intensity value of each pel with said predicted value to generate a series of error bits;
    means (120, 121) for storing error bits for a reordering interval which includes N elements of said picture; and
    means (130) for run length encoding said stored error bits in a predefined order,
    characterized by
    means (102) for preprocessing said series of bits to eliminate runs of length one;
    logic means (107) responsive to said preprocessing means for generating at least a first control signal in the presence of a first set of said bits; and
    control means (140) jointly responsive to said reference signal and to the output of said logic means for storing said error bits in said storing means in an order different from the order in which said error bits are generated.

2. The invention defined in claim 1 wherein said first set of bits includes every odd bit.

3. The invention defined in claim 2 wherein said logic means (107) includes means (402) for generating a second control signal when the value of an even bit cannot be uniquely determined from the value of the two preceding and one subsequent bits; and said control means (140) is arranged to store said error bits in either a first group comprising odd bits with high confidence, a second group comprising odd bits with low confidence, or a third group comprising even bits for which said second control signal is generated.

4. The invention defined in claim 3 wherein said storing means (120, 121) includes first and second random access memories and steering means (122) for writing data into one of said RAMs while reading data from the other, during alternate ones of said reordering intervals.

5. The invention defined in claim 4 wherein said encoding apparatus further includes means (823) for encoding data in said first and second groups using a first code set and data in said third group using a second code set.

6. Apparatus for encoding a series of bits which represent the intensity values of elements of a picture, comprising:
means for preprocessing said series of bits to eliminate runs of length one;
means responsive to said preprocessing means for generating a prediction of the intensity value of each of said picture elements (pels) and a reference signal indicative of the confidence in each of said predictions;
means for comparing the predicted and true intensity values of each of said elements to generate a series of error values;
a memory having first, second and third storage regions;
means for storing error values from a first group of pels in said first or second regions, depending upon said reference value, and error values from a second group of pels in said third region; and
means for sequentially run length coding the error values stored in said memory regions.

7. The ivention defined in claim 6 wherein said first group includes alternate pels and said second group includes only those remaining pels having an intensity value which cannot be precisely determined from the intensity values of neighboring pels.

8. The invention defined in claim 6 wherein said first group of pels includes all odd numbered pels in a reordering interval which includes N pels numbered from 1 to N and said second group of pels includes only those even numbered pels having an intensity value which is not uniquely determined by the values of two preceding pels and one succeeding pel.

9. The invention defined in claim 8 wherein said preprocessing means includes pattern recognition means arranged to invert the value of at least one of said bits upon each detection of a bit pattern indicative of a run of length one.

10. The invention defined in claim 9 wherein said storing means includes first, second and third counters each arranged to generate addresses for data storage in said first, second and third regions, respectively, said first counter being reset to a count of 1 at the beginning of each of said reordering intervals and counting up for each odd pel having a first reference value, said second counter being reset to a count of N/2 at the beginning of each of said reordering intervals and counting down for each odd pel having an opposite reference value, and said third counter being reset to a count of (N/2)+1 at the beginning of each of said reordering intervals and counting up for each even pel in said second group.

11. The invention defined in claim 10 wherein said run length coding means is arranged to use a first code dictionary for run lengths in said first and second memory regions and a second code dictionary for run lengths in said third memory region.

12. Apparatus for encoding a series of bits each representing the intensity value of a particular element of a facsimile picture including:
(a) means for filtering said bits to eliminate instances in which a single bit has a value opposite to the values of bits associated with adjacent picture elements;
(b) means for predicting the values of first and second sets of the filtered bits;
(c) means for comparing each of the values of said first and second sets of bits with the predicted value thereof to generate a first group and second group of error values;
(d) means for generating a binary state signal indicating whether the confidence in each error value in said first group is low or high;
(e) a memory;
(f) means for sorting said error values so that high confidence error values and low confidence error values from said first group are entered into first and second regions of said memory, respectively, and so that error values from said second group are entered into a third region of said memory; and
(g) means for sequentially applying the contents of said memory to a run length encoder.

13. The invention defined in claim 12 wherein said filtering means is arranged to invert the intensity value of said single bit.

14. The invention defined in claim 13 wherein said first set of bits includes alternate ones of said bits.

15. The invention defined in claim 14 wherein said second set of bits each have a value which cannot be determined from the value of the two previous and one following bits.

16. The invention defined in claim 15 wherein said comparing means includes an exclusive OR gate.

17. The invention defined in claim 12 wherein said memory includes N storage locations designated 1, 2 . . . N, where N is the number of picture elements in a reordering interval; and
said first region includes storage locations 1, 2, 3 . . . n, said second region includes storage locations N/2, (N/2)−1, (N/2)−2 . . . (n+1), and said third region includes storage locations (N/2)+1, (N/2)+2 . . . N, where n may vary from one reordering interval to another.

18. A method of encoding a series of bits each representing the intensity value of a particular element of a picture, including the steps of:
preprocessing said bits to eliminate instances in which a single bit has a value opposite to the value of both adjacent bits;
predicting the intensity value of each of said picture elements;
generating a state signal indicating whether each prediction is likely to be good or bad;

comparing the intensity values of said pels with the predicted values thereof to generate a series of error values;

sorting error values for a first set of pels including every alternate pel so that high and low confidence error values are entered into first and second separate regions of a memory, respectively, and so that error values for a second set of pels including only selected ones of the remaining pels are entered into a third separate region of said memory; and run length encoding the contents of said memory in a region by region order.

19. The invention of claim 18 wherein said preprocessing step includes inverting the value of said single bit.

20. The invention defined in claim 19 wherein said sorting step includes selecting pels in said second set in response to the intensity values of the two preceding pels and the subsequent pel.

21. Apparatus for encoding a binary facsimile signal, including:

means for eliminating runs of length one from said signal;

means responsive to said last mentioned means for generating a binary prediction error signal, each bit of said error signal representing the difference between the intensity value of a particular element of a picture and a corresponding predicted value thereof;

means for sorting odd and even bits of said error signal into first and second groups;

means for eliminating from one of said groups bits representing picture elements whose intensity value is predictable from the intensity value of surrounding picture elements; and means for sequentially run length coding said first and second groups.

* * * * *

UNITED STATES PATENT AND TRADEMARK OFFICE
CERTIFICATE OF CORRECTION

PATENT NO. : 4,185,303

DATED : January 22, 1980

INVENTOR(S) : Frank W. Mounts, Arun N. Netravali and Kenneth A. Walsh

It is certified that error appears in the above-identified patent and that said Letters Patent are hereby corrected as shown below:

Column 5, lines 16-35, Table 1 should read

Table 1

| Possible combination | r (even) | s (odd) | t (even) | u (odd) | Eliminated by preprocessing | Value of t determined by values of r, s and u | Value of t is "needed" |
|---|---|---|---|---|---|---|---|
| 1  | 1 | 1 | 1 | 1 |   | ✓ |   |
| 2  | 1 | 1 | 1 | 0 |   |   | ✓ |
| 3  | 1 | 1 | 0 | 1 | ✓ |   |   |
| 4  | 1 | 1 | 0 | 0 |   |   | ✓ |
| 5  | 1 | 0 | 1 | 1 | ✓ |   |   |
| 6  | 1 | 0 | 1 | 0 | ✓ |   |   |
| 7  | 1 | 0 | 0 | 1 |   | ✓ |   |
| 8  | 1 | 0 | 0 | 0 |   | ✓ |   |
| 9  | 0 | 1 | 1 | 1 |   | ✓ |   |
| 10 | 0 | 1 | 1 | 0 |   | ✓ |   |
| 11 | 0 | 1 | 0 | 1 | ✓ |   |   |
| 12 | 0 | 1 | 0 | 0 | ✓ |   |   |
| 13 | 0 | 0 | 1 | 1 |   |   | ✓ |
| 14 | 0 | 0 | 1 | 0 | ✓ |   |   |
| 15 | 0 | 0 | 0 | 1 |   |   | ✓ |
| 16 | 0 | 0 | 0 | 0 |   | ✓ |   |

UNITED STATES PATENT AND TRADEMARK OFFICE
CERTIFICATE OF CORRECTION

PATENT NO. : 4,185,303

DATED : January 22, 1980

INVENTOR(S) : Frank W. Mounts, Arun N. Netravali and Kenneth A. Walsh

It is certified that error appears in the above-identified patent and that said Letters Patent are hereby corrected as shown below:

Column 9, line 24, "R" should read --$\bar{R}$--. Column 11, lines 47-56, Table 2 should read

Table 2

| r | s | t | u | Derived value of t | Use Derived Value | Use Decoded Value |
|---|---|---|---|---|---|---|
| 1 | 1 | 1 |   | 1 | ✓ |   |
| 0 | 1 | 1 |   | 1 | ✓ |   |
| 1 | 0 | 1 |   | 0 | ✓ |   |
| 0 | 0 | 1 |   | don't care |   | ✓ |
| 1 | 1 | 0 |   | don't care |   | ✓ |
| 0 | 1 | 0 |   | 1 | ✓ |   |
| 1 | 0 | 0 |   | 0 | ✓ |   |
| 0 | 0 | 0 |   | 0 | ✓ |   |

Column 11, line 62, "u r s + u r s" should read --u $\bar{r}$ $\bar{s}$ + $\bar{u}$ r s--. Column 11, line 67, "u s r + u s r" should read --u $\bar{s}$ $\bar{r}$ + $\bar{u}$ s r--.

Signed and Sealed this

Ninth Day of December 1980

[SEAL]

Attest:

SIDNEY A. DIAMOND

Attesting Officer

Commissioner of Patents and Trademarks